United States Patent [19]

Wolf

[11] 4,072,436
[45] Feb. 7, 1978

[54] IMPLEMENT, ESPECIALLY FOR LAWN WORK

[76] Inventor: Bobby G. Wolf, R.R. No. 2, Box 59, Lafontaine, Ind. 46940

[21] Appl. No.: 749,169

[22] Filed: Dec. 9, 1976

[51] Int. Cl.² .......................................... E01C 19/26
[52] U.S. Cl. .................................................. 404/122
[58] Field of Search .............. 404/122, 131, 128; 298/17 R, 24, 38

[56] References Cited

U.S. PATENT DOCUMENTS

| | | | |
|---|---|---|---|
| 1,749,805 | 3/1930 | Elliott | 404/128 X |
| 2,044,684 | 6/1936 | Haigh | 404/85 |
| 2,217,871 | 10/1940 | Lindgren | 298/17 R |
| 2,867,474 | 1/1959 | Linn | 298/17 R X |
| 2,962,950 | 12/1960 | Martin | 404/128 X |
| 3,016,268 | 1/1962 | Hadden | 298/17 R |
| 3,071,051 | 1/1963 | Martin | 404/128 |
| 3,092,272 | 6/1963 | Weigel | 298/17 R |
| 3,260,547 | 7/1966 | Heilig | 298/17 R X |
| 3,316,822 | 5/1967 | Seaman | 404/128 |
| 3,578,806 | 5/1971 | Tonelli | 298/17 R |

*Primary Examiner*—Nile C. Byers
*Attorney, Agent, or Firm*—Gust, Irish, Jeffers & Rickert

[57] ABSTRACT

An implement, especially for lawn work, in which a lawn roller is rotatably supported beneath a substantially horizontal frame extending above the roller, with the frame having an element of hitch means in the forward end and tiltably supporting a cargo body which can be tilted upwardly to discharge the contents at the rearward end of the frame.

8 Claims, 5 Drawing Figures

IMPLEMENT, ESPECIALLY FOR LAWN WORK

BACKGROUND OF THE INVENTION

1. Field of the Invention

The present invention relates to an implement, especially for lawn work, and is particularly concerned with an implement of the nature referred to which can be put to various uses.

2. Description of the Prior Art

A lawn roller is a known implement for use in the care of lawns and usually comprises a cylindrical drum having a handle attached to a central shaft so that the roller can be manually rolled on the lawn. Such a roller usually has a filling opening so that it can be filled with a weighting liquid, such as water.

Cargo body vehicles are also known for lawn use and usually comprise a frame having supporting wheels and a body mounted on the frame which can receive articles to be moved about, debris, earth, and the like, or other purposes.

The present invention proposes a novel combination of a lawn roller implement with a cargo body in such a manner that the individual parts of the implement can be used individually, or so that they will cooperate in producing a desired result.

SUMMARY OF THE INVENTION

According to the present invention, a substantially horizontal frame is provided which may consist, for example, of laterally spaced parallel rails, such as, channel members, which are interconnected by transverse members and which frame has at one end, an element of hitch means so that it can be connected to a towing vehicle, such as a garden tractor, or the like.

The frame is rotatably supported by a lawn roller, or, as in one modification, a pair of rollers in coaxial, end to end, relation. The lawn roller comprises the rolling support for the frame so that it can be moved about as by a garden tractor.

Tiltably mounted on the frame is a cargo body which opens upwardly and which has an open rearward end closed as by a swingable gate. The pivotal connection of the body with the frame extends transversely of the body near the bottom thereof and also forwardly of the center of the body, and transversely of the frame in the region above the aforementioned roller. The body and frame have cooperating elements of latch means thereon toward the front end of the body so that the body can be latched in horizontal position on the frame, or unlatched therefrom to be tilted on the frame to discharge cargo from the rear end of the body.

The body can be weighted, when desired, in order to provide for more effective treatment of a lawn surface by the lawn roller, while the roller provides rolling support for the body to permit transporting dirt or other heavy loads across a lawn without leaving wheel ruts therein.

An object of the present invention is the provision of a novel type lawn implement having a variety of uses.

Another object of the present invention is the provision of a lawn implement which includes a lawn roller and a cargo body that can be employed for moving cargo about.

According to one modification, the roller is formed of two rollers in coaxial, end to end, relation for improved maneuverability of the implement in making turns.

The roller is advantageously provided with a sealable filling opening so that a weighting liquid can be supplied thereto, if desired.

The exact nature of the present invention and the several objects and advantages thereof will become more apparent upon reference to the following detailed specification taken in connection with the accompanying drawings.

DESCRIPTION OF THE PREFERRED EMBODIMENTS

Figure 1:
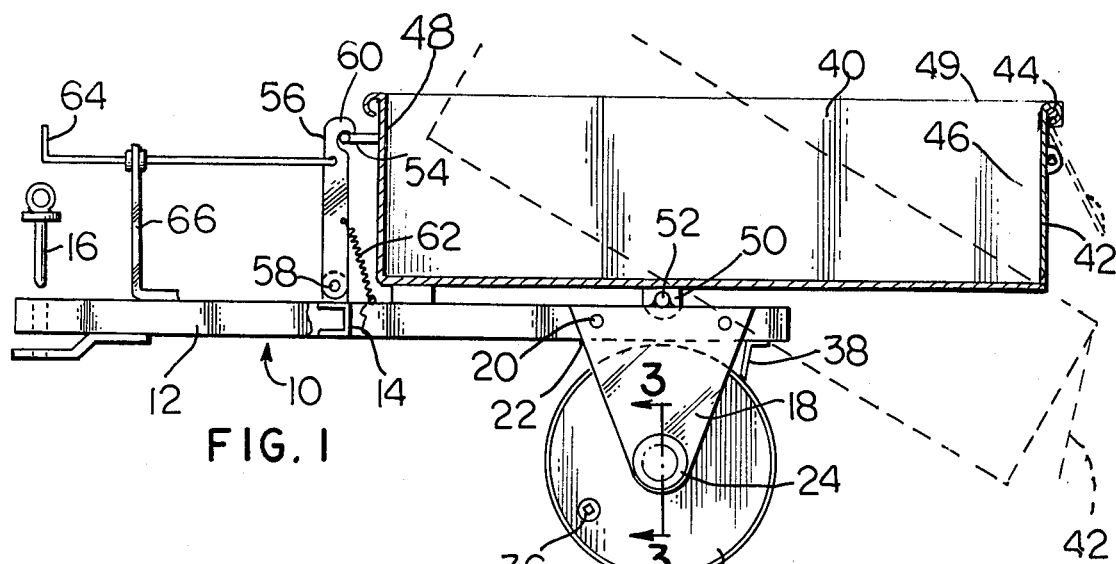
FIG. 1 is a side view, partly broken away, showing the implement according to the present invention.

Referring to the drawings somewhat more in detail, the implement shown therein, as will best be seen in FIG. 1, comprises a frame 10 which may be made up of a pair of spaced, parallel channel members 12 opening toward each other and interconnected as by transversely extending channel members 14, which can be welded in place between the channel members 12. While channel members are shown, angle or members having other cross-sections may be used.

The frame 10, at the forward end of the implement, and which is the left side of the implement as it is viewed in FIG. 1, comprises a hitch element 16 which may take the form of a pin adapted to drop through an eye on a hitch member extending rearwardly from a towing vehicle, such as a garden tractor. Toward the rear end of frame 10, a depending bracket 18 of substantial size and strength is fixed to each side of the frame as by welding, or by bolts 20.

The lateral edges of each bracket 18 are preferably formed as a flange, as at 19, so that each bracket is generally concave on the side facing the other, thereby substantially stiffening the brackets. The flange portion 19 of each bracket may be welded at 22 to the underside of the respective channel member 12, if so desired.

Toward the lower end of each bracket 18, there is secured a sleeve 24, as by welding, for receiving a bearing 26 that engages the adjacent end of a shaft 28 that extends through and is preferably welded to each end of a lawn roller 30, as at 31. A cap 32 may be provided for closing sleeve 24 toward the outside, while a seal ring 34 may be provided sealing about shaft 28 toward the inside of the respective bracket 18.

Roller 30 may be a substantially conventional lawn roller drum and is in the form of a sealed hollow cylinder which may have a filling opening provided with a removable closure 36 so that a weighting liquid, such as water, can be supplied to the drum in order to give desired weight thereto.

A scraper member 38 may be secured to the underside of frame 10 and slidingly engages the periphery of the roller to dislodge material picked up by the roller. Such a scraper element can be provided on each of the forward and rearward sides of the roller so that unwanted debris is dislodged from the surface of the roller in each direction of rotation thereof.

The substantially horizontal frame 10 has supported on the top thereof, a cargo body 40 which is open to the top and to the rear, with the rear end 46 being closable by a gate 42 pivoted to the cargo body adjacent upper edge 49 thereof by hinge means 44.

Figures 2, 3:
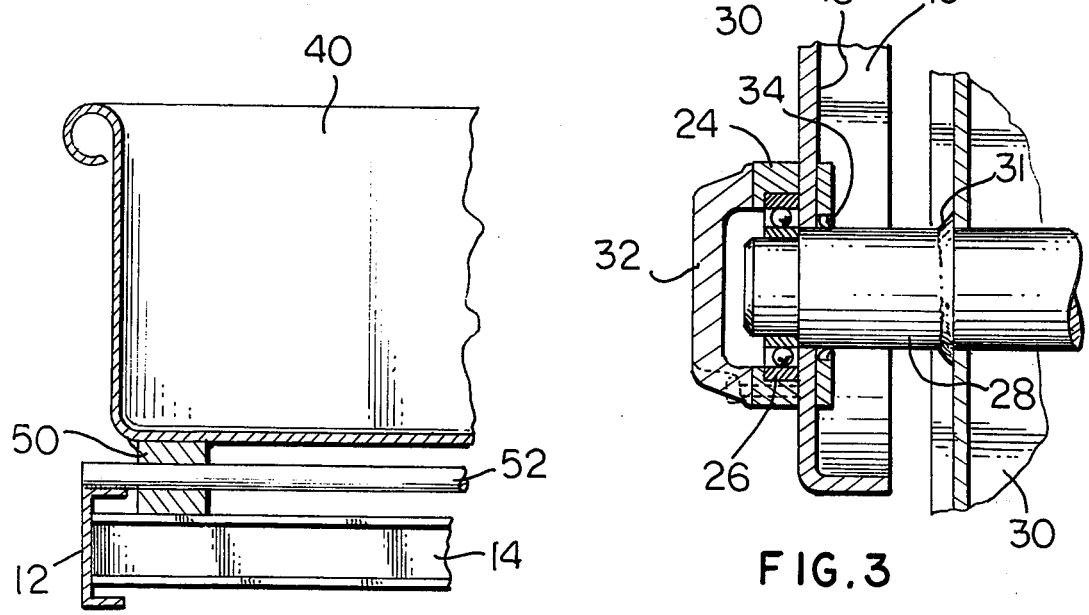
FIG. 2 is a fragmentary view showing the tiltable support of the body on the frame.
FIG. 3 is a fragmentary sectional view, indicated by line 3—3 on FIG. 1, showing a bearing for rotatably connecting the implement frame to the roller therebeneath.

Intermediate the opposite ends 46, 48 thereof but forwardly of the transverse centerline, the body 40 has a pair of bearing sleeves 50 secured thereto, as by welding, and through which there passes a pivot rod 52 which may have the ends fixed to the upper side of frame 10 in any suitable manner, for example, as by welding. The connection of one end of bearing rod 52 to frame 10 is illustrated in FIG. 2.

At the forward end 48 of body 40, namely, the left end as it is viewed in FIG. 1, the body 40 carries an element 54 of latch means that includes a second element 56 which is pivotally supported at 58 on frame 10. Element 56 has a hook-like nose portion 60 adapted for engaging over element 54 on body 40.

A spring 62 continuously biases latch element 56 toward engaging position with the latch element on body 40; while a pull bar 64, accessible to the rider of a towing vehicle, is connected to the latch element 56 for moving it to disengaging position. A support arm 66 holds draw bar 64 in the proper position for easy access to the operator of the draft vehicle.

It will be apparent that cargo placed in the cargo body, when sufficiently heavy, will load the lawn roller 30, and it will also be evident that lawn roller 30 has the dual function of rolling the lawn, while also movably supporting frame 10 and body 40. It will also be apparent that by reason of the location of pivot rod 40 forwardly of the center of body 40, when the body is loaded with dirt release of latch element 56 will result in body 40 tilting, as shown in dashed lines in FIG. 1, thereby to dump and spread the load of dirt. Tail gate 42 automatically pivots outwardly when body 40 is tilted. Tilting of body 40 is limited by scraper 38.

Figure 4:
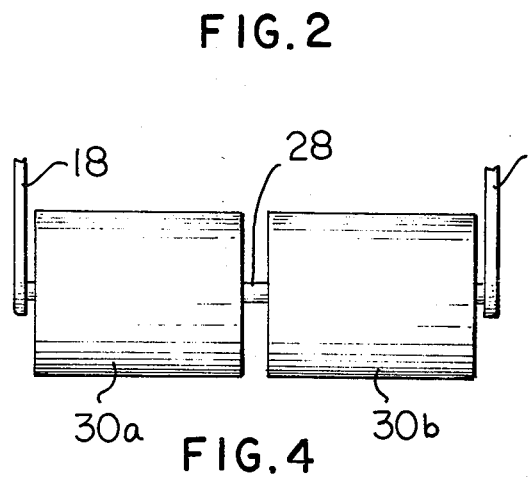
FIG. 4 is a fragmentary view showing how two rollers could be placed in coaxial, end to end, relation beneath the frame.
Figure 5:
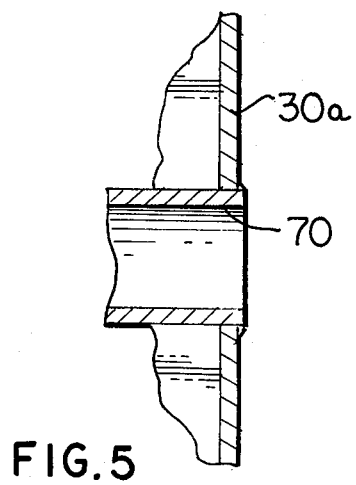
FIG. 5 is a fragmentary view showing how each of the rollers of FIG. 4 would be provided with a central sleeve to permit independent rotation of the rollers on a common supporting shaft.

In order to impart greater maneuverability of the implement, the roller 30 may be subdivided into axial sections 30a and 30b as shown in FIG. 4. This will permit the sections of the roller to rotate independently, thereby imparting more maneuverability to the implement when it turns corners and the like. Each roller in FIG. 4 is advantageously constructed as in FIG. 5 to have a center sleeve 70 through which the support shaft 28 extends and between which sleeve and such shaft, bearings can be provided for reducing friction.

While there have been described above the principles of this invention in connection with specific apparatus, it is to be clearly understood that this description is made only by way of example and not as a limitation to the scope of the invention.

What is claimed is:

1. An implement for use in lawn work comprising: a generally horizontal frame having forward and rear ends, a hitch on said forward end, a cylindrical roller rotatably connected to said frame toward said rear end thereof and having an axis of rotation extending transversely of said frame, an upwardly opening cargo body having a forward end and an open rear end, said body being tiltably mounted on said frame above said roller, said roller being positioned beneath the center portion of the length of said body and being substantially the sole ground support for said body, and gate means pivotally connected to said body for opening and closing said rear end thereof.

2. An implement according to claim 1 in which the tiltable mounting of said body to said frame is intermediate said front and rear ends of said body and extends transversely of said body.

3. An implement according to claim 2 in which said tiltable mounting is forward of the center of the length of the body and depends from the bottom of the body.

4. An implement according to claim 3 in which the axis of rotation of said roller is disposed in a vertical plane adjacent the tiltable mounting of said body.

5. An implement according to claim 1 which includes cooperating elements of latch means on the forward region of said cargo body and the adjacent region of said frame for retaining said body in a generally horizontal position.

6. An implement according to claim 5 in which said element of latch means on said frame is in the form of a lever upstanding at the front of said body and pivoted at the lower end on said frame, said lever being tiltable in the fore and aft direction to latchingly engage the element of latch means on said body and selectively to disengage therefrom.

7. An implement according to claim 1 in which said frame comprises longitudinally extending laterally spaced rails and laterally extending members interconnecting said rails, and members connected to said rails and depending therefrom for rotatably supporting said roller.

8. An implement according to claim 1 in which said roller comprises a pair of rollers in coaxial, end to end, independently rotatable relation.

* * * * *